(No Model.)

A. C. TRACY.
MILKING PAIL.

No. 255,702. Patented Mar. 28, 1882.

Witnesses:
J. W. Garner
W. J. Osgood.

Inventor:
Anza C. Tracy.
Howard A. Thom,
Attorney.

UNITED STATES PATENT OFFICE.

ARZA C. TRACY, OF LONE ROCK, WISCONSIN.

MILKING-PAIL.

SPECIFICATION forming part of Letters Patent No. 255,702, dated March 28, 1882.

Application filed August 29, 1881. (No model.)

*To all whom it may concern:*

Be it known that I, ARZA C. TRACY, a citizen of the United States of America, residing at Lone Rock, in the county of Richland and State of Wisconsin, have invented certain new and useful Improvements in Milking-Pails; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to milking-pails; and it consists in the construction and arrangement of strainers placed in the cover, as will be hereinafter fully set forth.

Figure 1:
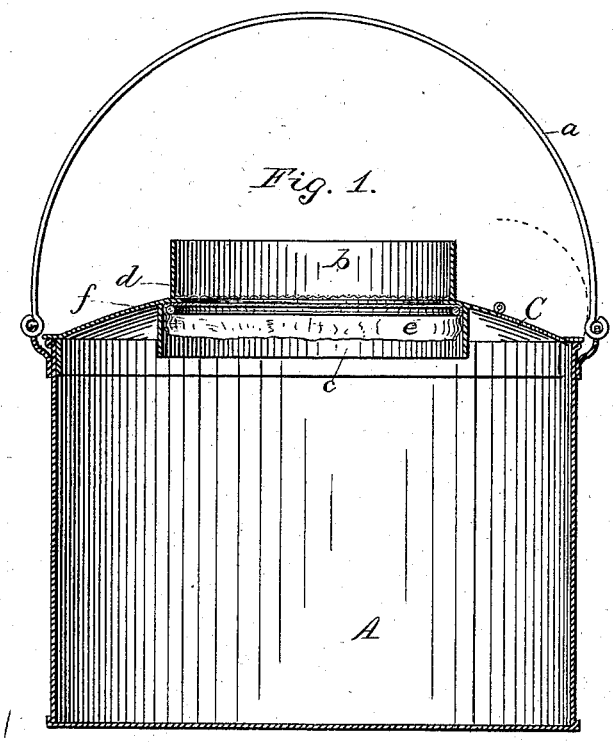
Figure 2:
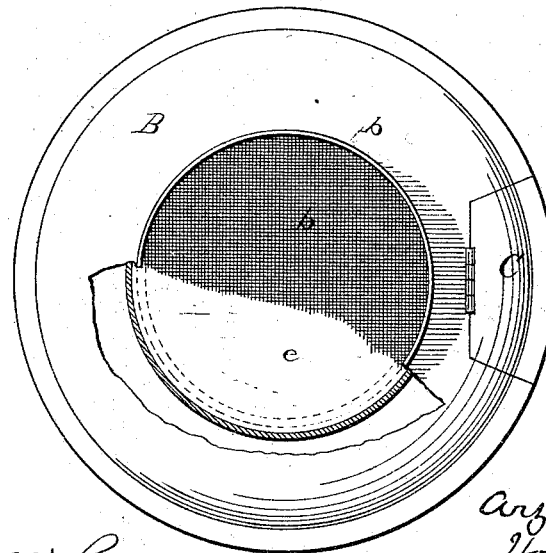

The accompanying drawings, in which Figure 1 is a vertical cross-section, and Fig. 2 a plan view partly in section, fully illustrate my invention.

A is a milk-pail of ordinary construction. It has a bail, $a$, secured to its sides by the device commonly employed.

B is the cover or top, in the center of which is a circular opening, as shown. Upon the top of the cover, and around the circular opening, is placed the flange $b$, which may be made flaring, if desired. Upon the under side of the cover is secured the flange $c$, which is of larger diameter than the flange $b$. Placed within the flange $b$, and resting upon a narrow rim of the cover projecting within the flange, is the wire strainer $d$. Stretched across the top of the flange $c$ is the cloth strainer $e$. It is held in place within the flange by the circular wire spring $f$, as shown.

C is a trap placed in the side of the cover, and which, when the pail is full, may be opened and the milk poured out.

By this arrangement of strainers I secure a pail into which no foreign substances can penetrate, and the milk coming from it will be perfectly free from all impurities.

What I claim as new is—

A combination wire and cloth strainer arranged within the flanges $b$ and $c$ of a milk-pail cover, and operating substantially as and for the purposes set forth.

In testimony whereof I affix my signature in presence of two witnesses.

ARZA CUTLAR TRACY.

Witnesses:
 A. W. TOWSLEY, Jr.,
 W. W. RUNYAN.